(12) United States Patent
Eastin

(10) Patent No.: US 7,674,976 B2
(45) Date of Patent: Mar. 9, 2010

(54) PAINTABLE WALL PLATE COVERING ASSEMBLY AND METHOD

(76) Inventor: Susan Eastin, P.O. Box 462, Desmet, SD (US) 57231

( * ) Notice: Subject to any disclaimer, the term of this patent is extended or adjusted under 35 U.S.C. 154(b) by 0 days.

(21) Appl. No.: 12/171,732

(22) Filed: Jul. 11, 2008

(65) Prior Publication Data

US 2009/0014197 A1    Jan. 15, 2009

Related U.S. Application Data

(60) Provisional application No. 60/959,561, filed on Jul. 13, 2007.

(51) Int. Cl.
  *H02G 3/14*  (2006.01)
(52) U.S. Cl. ............................. 174/66; 174/67; 220/241
(58) Field of Classification Search ............... 174/66, 174/67; 220/241, 242; 312/328; D8/353; D13/177; 439/136, 143–147
  See application file for complete search history.

(56) References Cited

U.S. PATENT DOCUMENTS

| 4,293,173 | A | * | 10/1981 | Tricca | 439/148 |
| 5,675,125 | A | * | 10/1997 | Hollinger | 174/66 |
| 6,423,900 | B1 | * | 7/2002 | Soules | 174/66 |

* cited by examiner

*Primary Examiner*—Dhiru R Patel

(57) ABSTRACT

Disclosed embodiments relate to a wall plate assembly, such as for light switches and electrical outlets, that may be painted to coordinate with the color of a room's walls, trim, or décor. The wall plate assembly includes a transparent outer or cover plate and a concealed backing plate. A reverse side of the transparent outer plate can be painted and the backing plate attached to cover and protect the painted surface. Both the outer plate and the backing plate can be made of molded thermoplastic resin and will typically contain openings to provide access to switches, outlets, plugs, jacks, mounting posts, etc., as well as any holes requires by fasteners such as screws.

14 Claims, 4 Drawing Sheets

PAINTABLE WALL PLATE COVERING ASSEMBLY AND METHOD

RELATED APPLICATIONS

This application claims the benefit of U.S. Provisional Application Ser. No. 60/959,561 filed Jul. 13, 2007, which is hereby incorporated by reference in its entirety.

BACKGROUND

The embodiments disclosed herein are drawn to an apparatus and process for providing a paintable wall plate or receptacle cover, such as those used to cover electrical switch and outlet boxes mounted on walls. A substantially transparent outer plate has a paintable reverse side and can also have an opening and one or more holes for mounting screws. An inner backing plate covers and protects the painted reverse side and includes matching opening and/or mounting screw hole(s). Both plates are then mounted to provide a painted wall plate covering with improved aesthetics and durability.

The majority of wall plates and receptacle covers come in white or beige to generally match the typical wall or trim color. If a user desires the plate to match the color of the panted wall, the user needs to paint the cover to match. However, the plate typically has a smooth exterior texture that easily shows paint imperfections such as brush marks and has poor adherence qualities that can lead to the paint scratching off. One prior art attempt to solve this is white or beige plates or covers that have a textured outer surface to improve paintability and hide brush marks. However, the texture of the resulting painted surface tends to collect dirt from users hands on switch plates during contact, resulting in unsightly plate appearance. For outlet covers, incidental contact with the prongs from power cords can still scratch the paint. What would be desirable is a wall plate or receptacle cover that can be easily painted, that does not show brush marks or other imperfections, and which is not subject to scratching off or showing dirt.

BRIEF SUMMARY OF THE INVENTION

Disclosed embodiments relate to a wall plate assembly, such as for light switches and electrical outlets, that may be painted to coordinate with the color of a room's walls, trim, or décor. The wall plate assembly comprises a transparent outer or cover plate and a concealed backing plate. A reverse side of the transparent outer plate can be painted. Both the outer plate and the backing plate can be made of molded thermoplastic resin and will typically contain openings to provide access to switches, outlets, plugs, jacks, mounting posts, etc., as well as any holes requires by fasteners such as screws.

In one embodiment for covering a receptacle box, the outer plate and the backing plate snap together at the screw passage points. Each screw opening on the outer plate has a cylindrical protrusion that extends from the reverse side. The cylindrical protrusion snaps into a slightly larger screw opening on the front of the backing plate. Alternately, the cylindrical protrusions could extend from the front of the backing plate and snap into the screw holes of the outer plate from the reverse side. Similarly, interlocking elements could be provided at the access opening or the edge of the plates.

The reverse side of the transparent outer or cover plate preferably has a semi-smooth, paintable surface that allows for brush-on, roll-on, or spray-on paint application. Because paint is applied to the reverse side of the outer plate, the paint is viewed through the transparent front face of the outer plate. This protects the paint from wear and damage and also hides any surface imperfections in the paint such as brush strokes or drips (which face and are visible only in the opposite direction, which is hidden by the backing plate).

Once the applied paint is dry, the backing plate connects or snaps into position on the reverse side of the outer plate for the purpose of providing a protective covering over the surface of the painted area. The assembly of the connected plates act as a single unit a may be attached over the junction box using screws. Other embodiments can use any suitable means for attachment of the assembly over the receptacle box.

DETAILED DESCRIPTION OF THE INVENTION

As used herein, the term plate or wall plate refers to switch cover plates, outlet receptacle plates, and plates or covers for any other type of receptacle box. The term receptacle box refers to any electrical junction box used for electrical wiring connections, including but not limited to electrical switches, electrical power outlets, electrical lights, electrical ceiling fans, telephone jacks, speaker wire outlets, antenna wire outlets, and cable-TV or data outlets. The term wall refers to walls, floors, and ceilings. The term transparent refers to materials that are substantially optically clear or translucent, as well as tinted variations, both darker and lighter, thereof.

Figure 1:
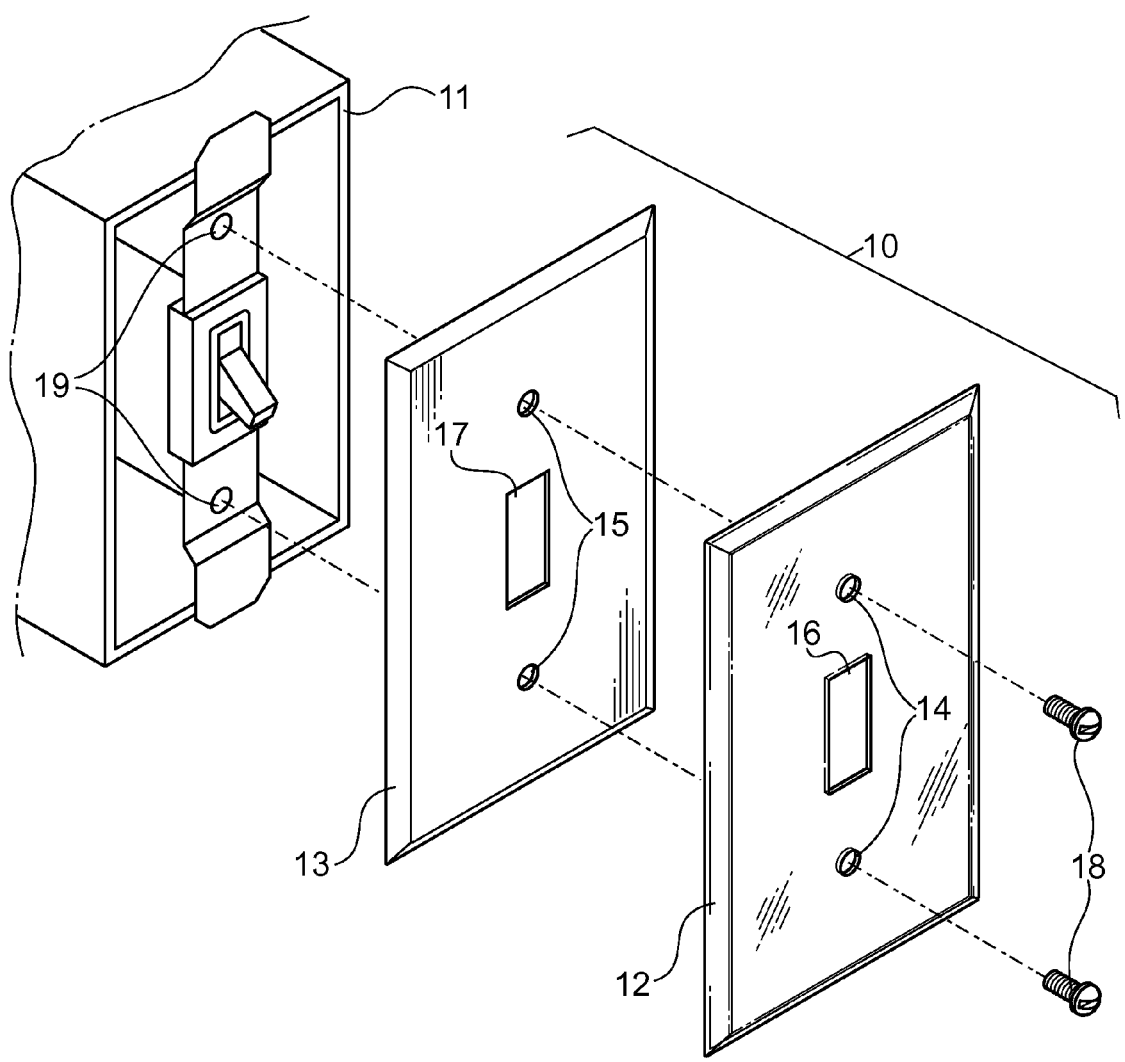
FIG. 1 illustrates an embodiment of an exploded view of an assembly used with a light switch.
Figure 2:
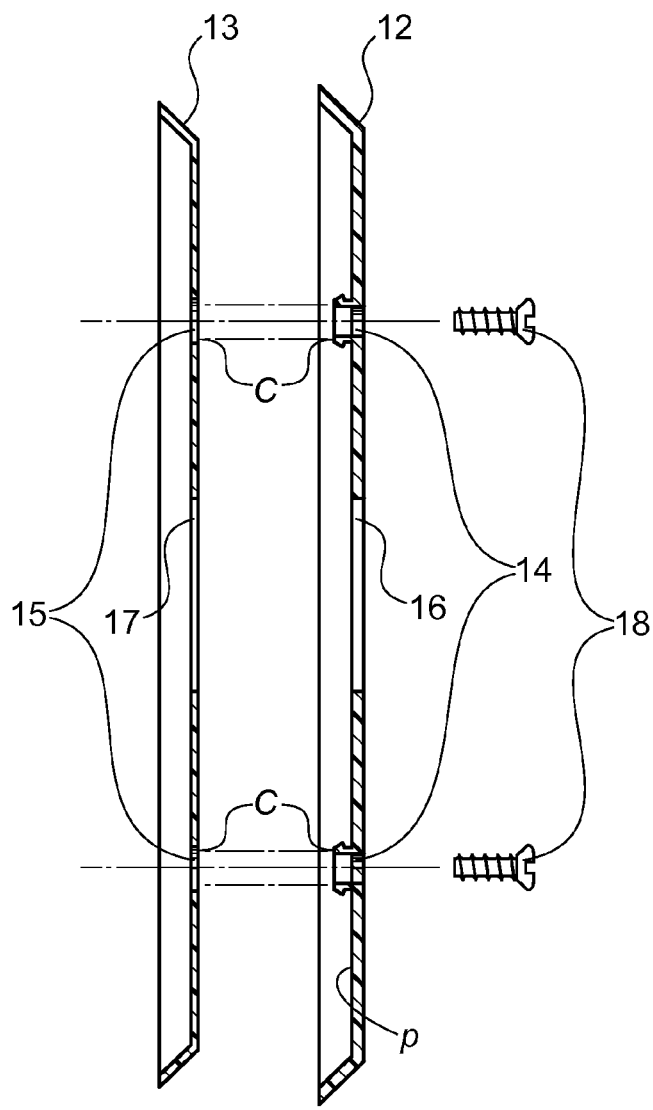
FIG. 2 illustrates a cross section of an embodiment.

FIGS. 1 and 2 illustrate an embodiment of a paintable wall plate covering assembly. In this embodiment, the wall plate assembly 10 is for covering an electrical light switch junction box 11 and uses a pair of screws 18 that attach to the threaded holes 19 on the light switch hardware (not shown in FIG. 2). The wall plate assembly 10 comprises a transparent outer plate 12 and a backing plate 13. These plates are typically formed of molded thermoplastic resin, but can be made of any suitable material. The transparent outer plate 12 in this example includes a pair of screw holes 14 and a switch opening 16. The backing plate 13 also includes a pair of screw holes 15 and a switch opening 17 that are positioned to coincide with those from plate 12.

In a basic form, the reverse surface P (see FIG. 2) of transparent plate 12 is painted. While it is possible to then mount plate 12 over the junction box 11, the paint on the reverse surface P of plate 12 is unprotected and can be damaged by an arcing switch or scratched during mounting and subsequent dismounting. To protect the paint on the reverse surface P of transparent plate 12, the backing plate 13 is used and is preferably connected or secured to the transparent plate 12 by a connection means that is not visible through the transparent plate 12 and that does not mar the painted surface P. One example of a connection means is illustrated in FIG. 2 by connection C, which comprises generally cylindrical projections extending from the reverse side of screw holes 14 that are dimensioned to frictionally engage or snap into oversized screw holes 15 on backing plate 13. The assembly 10 is then attached to junction box 11 using screws 18. In such usage, the attached backing plate 13 will protect the painted surface P from damage by an arcing switch or from possible scratching during mounting and subsequent dismounting/mounting of the plate assembly 10.

Figure 3:
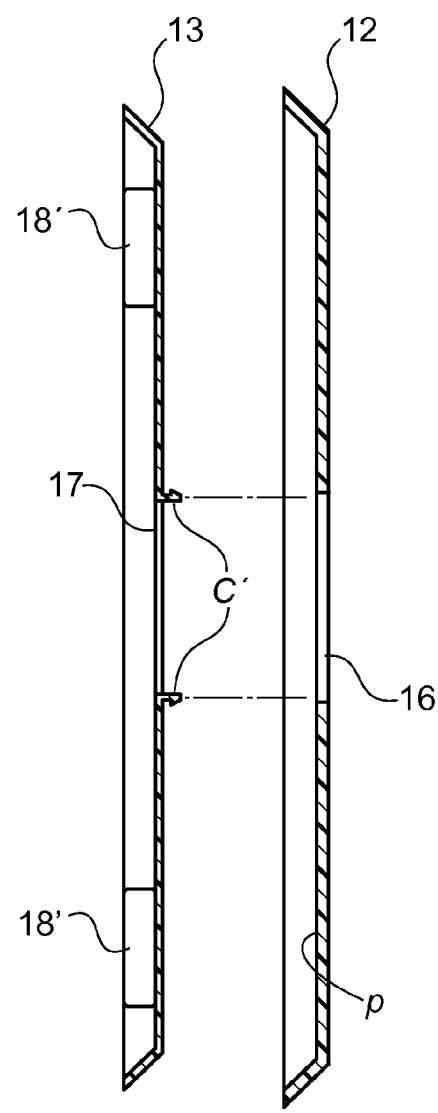
FIG. 3 illustrated a cross section of another embodiment.

While this arrangement is used for the disclosed light switch hardware, it will be understood by those in the art that the type, number and position of fasteners 18 can vary depending on the application. For example, typical power outlet receptacle covers use a single screw and typical multi-switch outlet covers with use a pair of screws for each switch. The type of fastener can also be varied. For example, fasteners 18' in the form of magnets (adhesively or mechanically attached) can be used on the reverse side of the backing plate 13 to eliminate the use screws altogether. In such a case, as illustrated in FIG. 3, an attachment structure C' associated with the switch or outlet openings 16 and 17 can be used to secure the transparent outer plate 12 to the backing plate 13. While illustrated with C' extending from opening 17 to engage the edge of opening 16, it is also possible to have the connection C' extend inward from the reverse side of opening 16 to engage the edge of opening 17. If the plate is a blank without a switch or outlet opening (not illustrated), the attachment structure can be formed as part of screw holes as shown in FIG. 2 or as part of the respective plate edges.

Figure 4A:
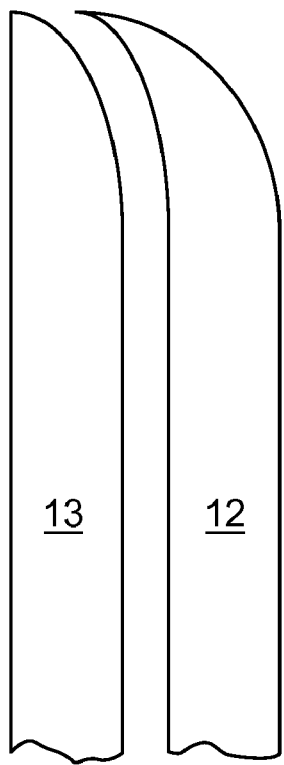
FIGS. 4A-4C illustrate a various embodiments of edge configurations.
Figure 4B:
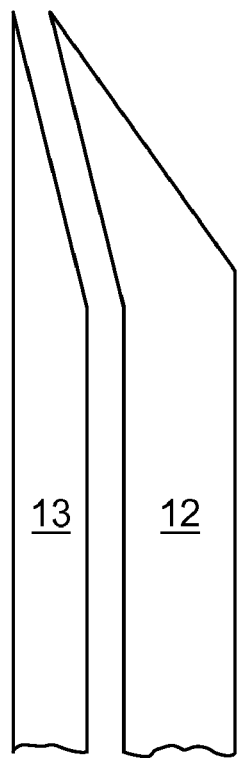
Figure 4C:
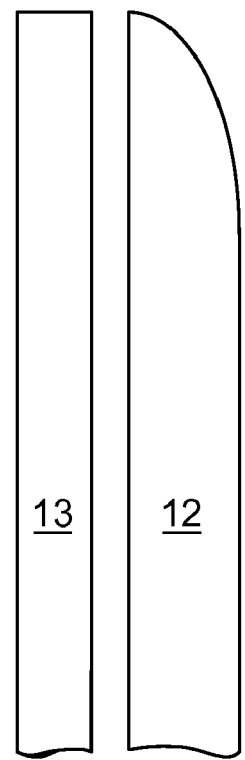

The plates 12 and 13 are illustrated in FIGS. 1-3 as having beveled edges, as are commonly found on wall plate covers. The only requirement for the edges is that the edge of the rear-most plate be dimensioned and in a plane for contact with a wall surface adjacent the receptacle box. In the illustrated embodiment, the backing plate 13 nests within the reverse side of transparent plate 12. However, neither the beveled edges nor the nesting are required for practice of the invention and numerous other arrangements are contemplated. For example, FIG. 4A illustrates an example of curved edges on both plates 12 and 13. FIG. 4B illustrates plates 12 and 13 as having different bevels, which allows the painted reverse surface of transparent plate 12 to extend to the outer edge. FIG. 4C illustrates transparent plate 12 as having a flat reverse surface and curved front surface (which could also be beveled, stepped, flat, or any other desired shape). In this arrangement, backing plate 13 is flat and does not nest within plate 12.

Figure 5:
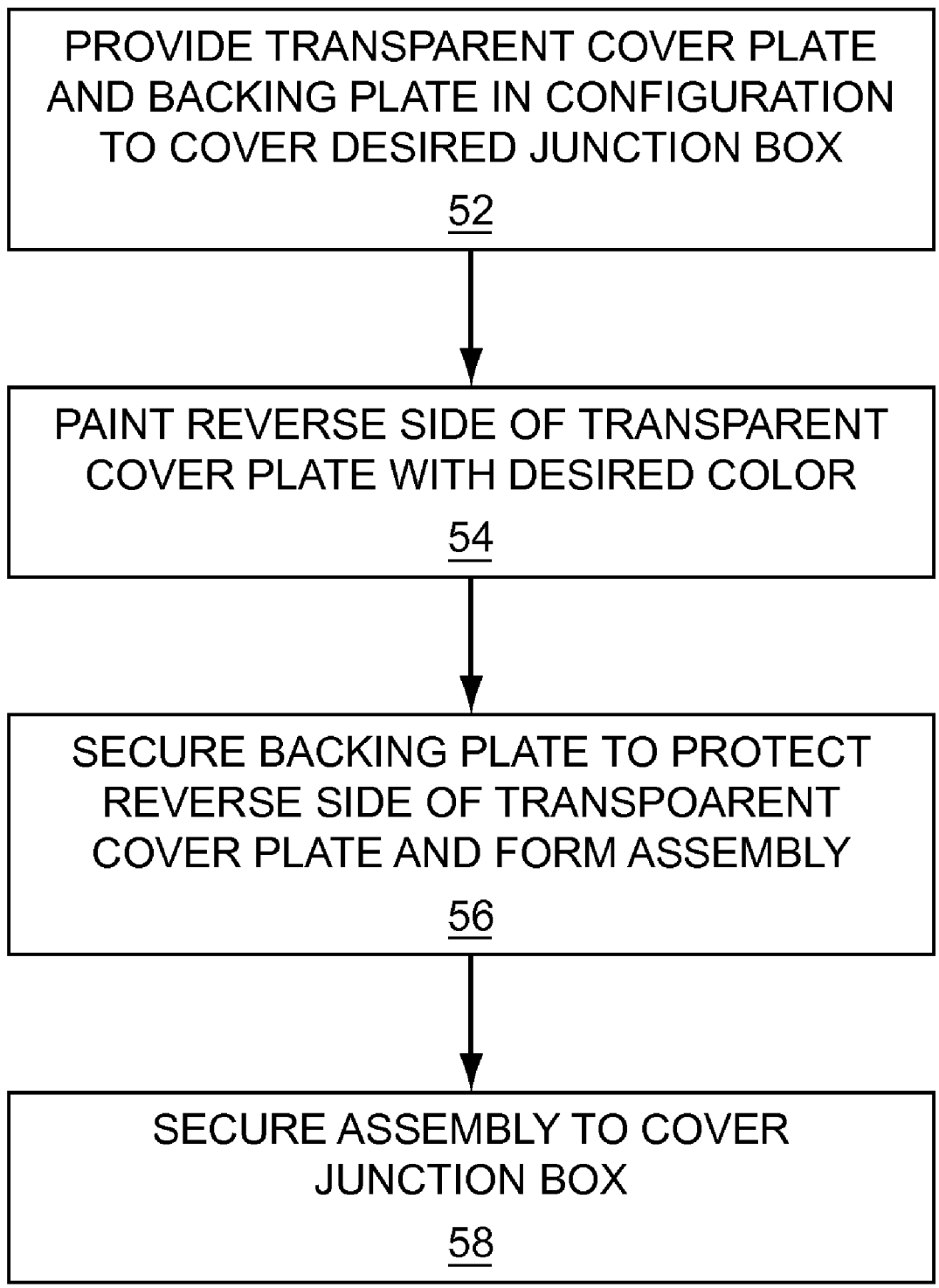
FIG. 5 illustrates a diagram of a process embodiment.

In use, as illustrated in FIG. 5, a transparent cover plate and backing plate are provided in a configuration to cover the desired junction box at 52. Depending on the type of junction box to be covered, the shape and size of the plates and the shape, size, and positions of any openings for access and attachments are used to determine the configuration. Plate shapes will typically include rectangular, square, octagonal, round, and oval shapes. Access openings can be rectangular (for rocker switches, etc.), square (for phone and data jacks, etc.), round (for dimmers, coaxial cable, power outlets, fan mounts, light mounts, etc.), or irregular (for power outlets, etc.).

The reverse side of the transparent cover plate is then painted the desired color (or colors, such as if a faux finish or multicolor design is desired—note however that the application of colors would be reversed) at 54. While the front and reverse surface of the transparent plate will typically be substantially smooth and flat, either or both of these surfaces may be textured to provide a desired aesthetic appearance or a translucent appearance. Similarly, while the transparent plate will typically be clear, it may be tinted to provide a desired shade of the paint color, e.g., tinted darker to provide a darker shade, tinted with a slightly opaque amount of white to lighten the shade, or even tinted with a color.

Indeed, while many embodiments will use a clear outer plate, such that the painted reverse surface will allow the wall plate or cover to blend into the wall, it may also be desirable to draw attention to the wall plate or cover with ornamentation such as sparkles, flowers, cartoon characters, stripes, patterns, borders, etc. that are pre-applied to the reverse surface, with the remaining portions being transparent. As such, when the reverse surface is painted, the pre-applied ornamentation will have a background of the desired color.

The backing plate is secured to the transparent plate to form an assembly at 56. It is preferable to form the assembly so that the backing plate will protect the painted surface. Regardless of the application method, the paint will conform to the shape of the reverse surface. In this manner, brush or roller marks are eliminated from view. The backing plate and transparent plate, preferably in an assembly, are then secured to the junction box at 58 in the manner suited to the configuration (i.e., with a single or with multiple screws, with magnets, etc.).

A paintable wall plate covering assembly and method has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A paintable wall plate assembly, comprising:
   a substantially transparent outer plate, the outer plate further comprising:
   a front surface, and a paintable reverse surface, a backing plate, the backing plate further comprising: dimensions to cover the paintable reverse surface of the outer plate, and a rear-most edge forming a planar contact surface; and means for attachment to a receptacle box, wherein the means for attachment to the receptacle box comprises a screw hole in the outer plate and a screw hole in the backing plate; and wherein an attachment structure comprises: a substantially-cylindrical extension from a reverse side of a screw hole in the outer plate, and a widened portion in a front side of a screw hole in the backing plate dimensioned for attachment to the substantially-cylindrical extension.

2. The paintable wall plate assembly of claim 1, wherein the substantially-cylindrical extension is dimensioned to snap into the widened portion.

3. The paintable wall plate assembly of claim 1, wherein the means for attachment to the receptacle box comprises a magnet attached to a reverse surface of the backing plate.

4. The paintable wall plate assembly of claim 1, wherein the backing plate is dimensioned to nest in the reverse surface of the outer plate.

5. The paintable wall plate assembly of claim 1, further comprising coextensive access holes in the outer plate and the backing plate.

6. The paintable wall plate assembly of claim 1, further comprising coextensive access holes in the outer plate and the backing plate,
   wherein the access holes further comprise the attachment structure.

7. The paintable wall plate assembly of claim 1, further comprising a decorative texture on the paintable reverse surface.

8. The paintable wall plate assembly of claim 1, further comprising a tinting medium in the transparent outer plate.

9. A method of covering a receptacle box with a painted wall plate assembly, comprising: applying paint to a reverse side of a transparent outer plate; allowing the applied paint to dry; attaching a backing plate to the reverse side of the transparent outer plate to form the painted wall plate assembly; securing the painted wall plate assembly to the receptacle box, wherein a screw is used to secure the painted wall plate assembly to the receptacle box through a screw hole in the outer plate and a screw hole in the backing plate; attaching the backing plate to the reverse side of the transparent outer plate with a substantially-cylindrical extension from a reverse side of the screw hole in the outer plate that attaches to a widened portion in a front side of the screw hole in the backing plate, and snapping the substantially-cylindrical extension into the widened portion.

10. The method of covering a receptacle box with a painted wall plate assembly of claim 9, further comprising securing the painted wall plate assembly to the receptacle box with a magnet on a reverse side of the backing plate.

11. The method of covering a receptacle box with a painted wall plate assembly of claim 9, further comprising nesting the backing plate in the reverse surface of the outer plate.

12. The method of covering a receptacle box with a painted wall plate assembly of claim 9, further comprising attaching the backing plate to the reverse side of the transparent outer plate with an attachment structure associated with coextensive access holes in the outer plate and the backing plate.

13. The method of covering a receptacle box with a painted wall plate assembly of claim 9, further comprising applying decorative elements to a portion of the reverse side of the transparent outer plate prior to applying paint.

14. The method of covering a receptacle box with a painted wall plate assembly of claim 13, further comprising selecting the decorative elements from the group consisting of sparkles, flowers, tints, cartoon characters, stripes, patterns, and borders.

* * * * *